United States Patent
Jougla et al.

(10) Patent No.: US 11,417,997 B2
(45) Date of Patent: Aug. 16, 2022

(54) MULTI-OUTPUT CHIRPED AMPLIFICATION CHAIN

(71) Applicant: THALES, Courbevoie (FR)

(72) Inventors: Paul Jougla, Elancourt (FR); Sébastien Laux, Elancourt (FR); Christophe Simon-Boisson, Elancourt (FR); Mathilde Charbonneau, Elancourt (FR)

(73) Assignee: THALES, Courbevoie (FR)

( * ) Notice: Subject to any disclaimer, the term of this patent is extended or adjusted under 35 U.S.C. 154(b) by 560 days.

(21) Appl. No.: 16/467,971

(22) PCT Filed: Dec. 7, 2017

(86) PCT No.: PCT/EP2017/081876
§ 371 (c)(1),
(2) Date: Jun. 9, 2019

(87) PCT Pub. No.: WO2018/114367
PCT Pub. Date: Jun. 28, 2018

(65) Prior Publication Data
US 2020/0091671 A1  Mar. 19, 2020

(30) Foreign Application Priority Data

Dec. 22, 2016 (FR) ................................. 1601833

(51) Int. Cl.
*H01S 3/00* (2006.01)
*G02B 27/09* (2006.01)
*H01S 3/23* (2006.01)
*H01S 3/16* (2006.01)

(52) U.S. Cl.
CPC ........ *H01S 3/0057* (2013.01); *G02B 27/0944* (2013.01); *H01S 3/2316* (2013.01); *H01S 3/1625* (2013.01)

(58) Field of Classification Search
None
See application file for complete search history.

(56) References Cited

U.S. PATENT DOCUMENTS

| 2005/0265407 A1 | 12/2005 | Braun et al. |
| 2013/0223460 A1 | 8/2013 | Cheriaux |

FOREIGN PATENT DOCUMENTS

FR 2872592 A1 * 1/2006 ........... H01S 3/0057

* cited by examiner

*Primary Examiner* — Mark Hellner
(74) *Attorney, Agent, or Firm* — BakerHostetler

(57) ABSTRACT

An M-output, where M>1, chirped pulse amplification chain that includes a stretcher of stretching factor tx_stretch, M amplifiers in cascade, M output compressors respectively placed at the output of each amplifier, wherein it comprises: a partially compressing device placed between the stretcher and the first amplifier, this partially compressing device having at least one partial compression factor, the one (or more than one) partial compression factor(s) being lower than tx_stretch, and an optical switch configured to receive a beam output from the stretcher and to direct it directly to the first amplifier of the cascade or to the partially compressing device depending on the output compressor chosen among the output compressors.

6 Claims, 6 Drawing Sheets

MULTI-OUTPUT CHIRPED AMPLIFICATION CHAIN

CROSS-REFERENCE TO RELATED APPLICATIONS

This application is a National Stage of International patent application PCT/EP2017/081876, filed on Dec. 7, 2017, which claims priority to foreign French patent application No. FR 1601833, filed on Dec. 22, 2016, the disclosures of which are incorporated by reference in their entirety.

FIELD OF THE INVENTION

The field of the invention is that of multi-output chirped amplification chains.

BACKGROUND

It will be recalled that a single-output amplification chain comprises at its input a stretcher the function of which is to temporally stretch a laser pulse with a stretching factor tx_stretch, the stretched pulse then being amplified by an amplifier then compressed by a temporal compressor of compression factor tx_compression=tx_stretch, placed in a vacuum chamber, as illustrated in FIG. 1. Sometimes, in the literature by convention tx_compression=−tx_stretch, which convention is not adopted below. The function of the compressor is to compensate for the stretching of the stretcher. The stretcher and the compressors typically comprise diffraction gratings.

An M-output amplification chain comprises at the output of the stretcher 100, M amplifiers in cascade, each amplifier $20_i$, i varying from 1 to M, being associated with its own compressor (there are therefore M compressors $30_i$), the outputs of each compressor together forming the M outputs of the chain, as illustrated in FIG. 2. On output from each laser amplifier, the laser beam may be sent to the compressor associated with said amplifier, or to the following amplifier.

Along the path of the pulse through an amplification chain, the pulse must respect certain constraints, including the fluence and energy constraints of each optical element, this requiring a minimum incident-beam diameter to be defined for each optical element. In the case of a multi-output amplification chain, this means that the higher the number of amplifiers, the larger the minimum beam diameter becomes (the spatial spread of the beam increases) as the rank of the amplifier in the cascade increases, and the larger the dimensions of the amplifier in question. As the dimensions of each element depend on this diameter, and as they are made as small as possible in particular for reasons of bulk and cost, this amounts to increasing the dimensions of the optical element and therefore its cost. The minimum diameter is largest at the end of the chain, i.e. at the input of output compressor No. M. The last compressor at the last output receives a laser pulse that is of high energy and therefore of large diameter in order to guarantee that the gratings used in this compressor are able to withstand the laser flux. In order to limit vignetting of the laser beam in this compressor, the gratings are far apart from one another, this resulting in an increase in the compression factor that thus is no longer equal to the stretching factor of the stretcher (which was calculated with respect to the flux resistance of the laser amplifiers without taking into account vignetting). Specifically, it will be recalled that the compression factor is proportional to the distance between the gratings. As the stretching factor must be equal to the compression factor for a transform-limited pulse to be delivered as output, the stretcher must be matched to the latter compressor and must have a stretching factor equal to the compression factor of the last compressor (compressor No. M). It is therefore necessary to match all the intermediate compressors (compressors Nos. 1 to M−1) to the stretching factor of the stretcher. The distance between their gratings becomes larger than is the case when they are used in single-output configuration, this requiring the dimensions of their gratings and of their vacuum chamber to be increased.

This problem will be illustrated in the following example with very high energies and high powers.

Consider for example a two-output chain with a stretcher of stretching factor equal to 10 ps/nm, an energy of 25 J at the output of amplifier No. 1, a power of 1 PW at the output of compressor No. 1, an energy of 250 J at the output of amplifier No. 2, and a power of 10 PW at the output of compressor No. 2.

The diffraction gratings that each compressor comprises typically have a flux resistance of about 200 mJ/cm². Each compressor is therefore dimensioned to work with an average fluence of 100 mJ/cm² in order to achieve a margin of safety and to not run the risk of damage.

Under such assumptions a very voluminous No. 2 compressor is required, the various diffraction gratings of which must be far apart in order to avoid any vignetting. The compression factor of such a compressor becomes high, typically 14 ps/nm, and differs from the stretching factor. It is therefore necessary to review the configuration of the entire chain.

A first solution consists in using a No. 1 compressor of same compression factor as compressor No. 2, this compression factor being equal to the stretching factor, i.e. to 14 ps/nm in our example. To do this, the diffraction gratings of compressor No. 1 must be further apart than for a stretching factor of 10 ps/nm; they must therefore be larger. The vacuum chamber of compressor No. 1 must for its part also be more voluminous.

Another solution consists in using compressors of different compression factors, for example 10 ps/nm for compressor No. 1, and 14 ps/nm for compressor No. 2, and in modifying the stretching factor of the stretcher depending on the envisioned output, for example by motorizing the second grating of the stretcher. However, the stretcher is a critical element.

An example of a diffraction-grating-comprising stretcher 10 is shown in FIG. 3; it is a question of a stretcher comprising an Offner triplet 1 and two diffraction gratings 11, 12 that are parallel to each other. In this configuration, the optic that the Offner triplet represents is composed of a concave mirror 2 and of a convex mirror 3 the radius of curvature of which is half that of the concave mirror. These mirrors are placed in a concentric geometry. The Offner triplet produces an image of the same size as the object. It is placed on the path that the pulses travel between the two inclined diffraction gratings 11, 12. One or more passages (denoted nbre_pass_ETR below) through the stretcher may be achieved by means of a folding prism (dihedron 13) as shown in the figure. The amount of dispersion introduced by the stretcher is determined by the distance G_ETR between the two gratings 11, 12.

During the motorized translation of one of the two gratings, the latter must remain parallel to each other in order not to introduce chromatic aberrations. Their etched grooves must also remain parallel to one another: the grooves of one grating remain parallel to the grooves of the other grating.

As may be seen in FIG. 3, it is therefore necessary to translate the larger and therefore heavier of the two gratings (grating 11) with a very good stability in roll/yaw/pitch.

Rapid passage from one output to the other may therefore require readjustment of the stretcher, and therefore inspection for chromatic aberrations at the output of the stretcher. Such a procedure takes time. It may also be seen in FIG. 3 that it is necessary to non-negligibly over-dimension the dihedron 13.

Therefore, there remains to this day a need for a multi-output chirped amplification chain that satisfactorily meets all of the aforementioned requirements in terms of adjustment stability, ease of operation, bulk and cost, simultaneously.

SUMMARY OF THE INVENTION

More precisely, one subject of the invention is an M-output, where M>1, chirped pulse amplification chain that comprises: a stretcher of stretching factor tx_stretch, M amplifiers in cascade, M output compressors respectively placed at the output of each amplifier.

It is mainly characterized in that it comprises:
- a partially compressing device placed between the stretcher and the first amplifier, this partially compressing device having at least one partial compression factor, the one (or more than one) partial compression factor(s) being lower than tx_stretch, and
- an optical switch configured to receive a beam output from the stretcher and to direct it directly to the first amplifier of the cascade or to the partially compressing device depending on the output compressor chosen among the output compressors.

This partially compressing device, which is placed between the stretcher and amplifier No. 1, allows the stretching factor to be matched to the compression factor of the various output compressors.

The beam output from the stretcher is sent, by means of the optical switch, either to the partially compressing device, or directly to amplifier No. 1. The user therefore rapidly passes from one operating mode to another, without readjustment of the stretcher as in the prior art.

This makes it possible both to avoid having to motorize a diffractive component of the stretcher and to obtain intermediate compressors (compressors 1 to M−1) that are compact as possible.

When M>2, the partially compressing device may include a partial compressor of adjustable compression factor, for example obtained by motorizing one of the diffraction gratings in a diffraction-grating-comprising partial compressor.

According to one alternative, when M>2, the partially compressing device comprises L partial compressors, 1<L<M, each partial compressor having a constant compression factor.

The amplification chain according to the invention is typically configured to amplify a pulse of a duration shorter than 100 fs.

A partially compressing device is placed between the stretcher and amplifier No. 1. It allows the stretching factor to be matched to the compression factors of the various output compressors. Intermediate outputs (outputs 1 to M−1) are thus optimized bulkwise. This makes it possible to both avoid having to motorize a diffractive component of the stretcher and to obtain compressors that are compact as possible.

Another subject of the invention is a method for using a pulse amplification chain, characterized in that it includes the following steps:
- stretching the pulse with the stretcher,
- depending on an output compressor chosen among said output compressors, sending the pulse to the partially compressing device via the optical switch or passing directly to the following step,
- sending the pulse through the cascade of amplifiers from the first amplifier to the amplifier associated with the chosen output compressor,
- sending the pulse to said chosen output compressor.

The beam output from the stretcher may be sent, by means of the optical switch, either to the partially compressing device, or directly to amplifier No. 1. The user therefore rapidly passes from one operating mode to another, without readjustment of the stretcher as in the prior art.

BRIEF DESCRIPTION OF THE DRAWINGS

Other features and advantages of the invention will become apparent on reading the following detailed description, which is given by way of nonlimiting example with reference to the appended drawings, in which.

DETAILED DESCRIPTION

In all the figures, elements that are the same have been referenced with the same references.

As indicated in the preamble, an amplification chain essentially includes a stretcher, an amplifier and a compressor. A stretcher and compressors that comprise diffraction gratings are considered.

Stretchers and compressors are similar: a stretcher is a compressor with a negative equivalent distance between its diffraction gratings, which distance is produced by an optical system of −1 magnification, hence the convention mentioned in the preamble.

Figure 1:
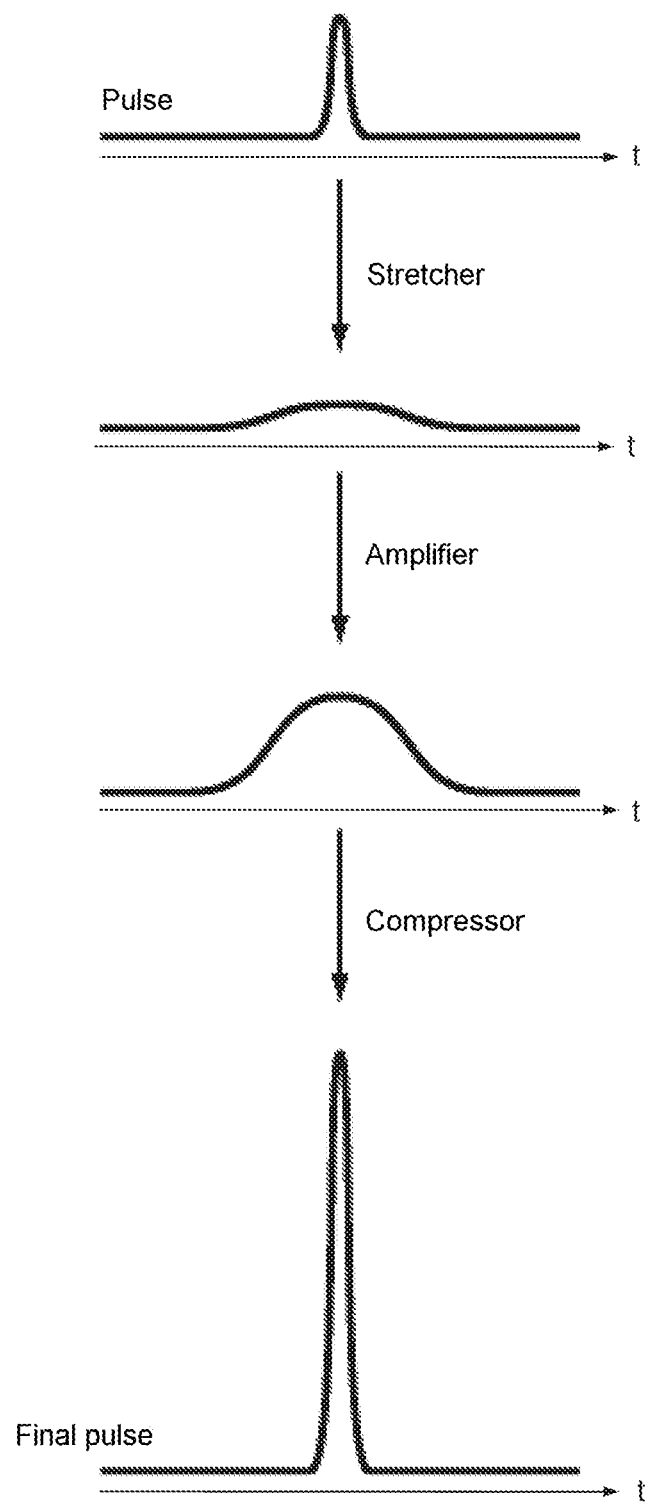
FIG. 1, which has already been described, schematically shows a single-output chirped amplification chain according to the prior art, FIG. 2, which has already been described, schematically shows a multi-output chirped amplification chain according to the prior art, FIG. 3, which has already been described, schematically shows an example of a prior-art stretcher, FIG. 4 schematically shows an example of a prior-art compressor, FIG. 5 schematically shows a multi-output chirped amplification chain according to the invention, FIG. 6 schematically shows an example of a constant-factor partial compressor of an amplification chain according to the invention, FIG. 7 schematically shows a first example of an adjustable-factor partial compressor comprising a folding dihedron, of an amplification chain according to the invention, FIG. 8 schematically shows a second example of an adjustable-factor partial compressor comprising two pairs of diffraction gratings, of an amplification chain according to the invention.
Figure 2:
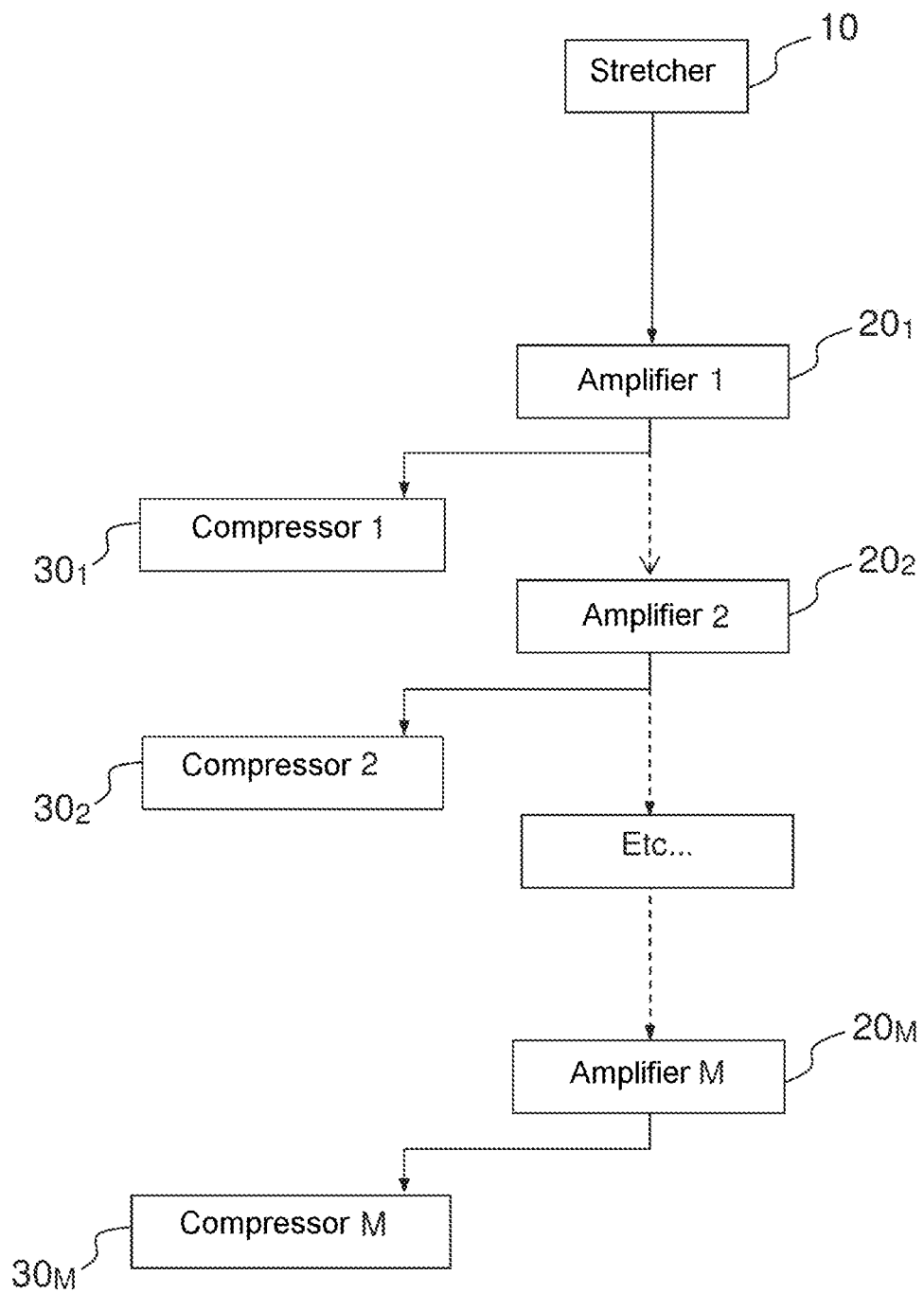
Figure 3:
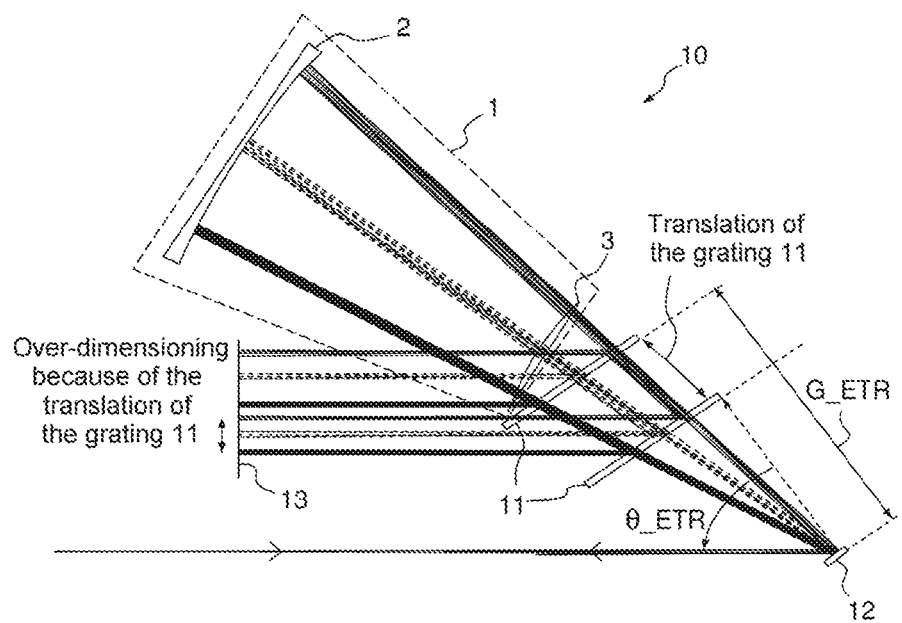

An example of a stretcher 10 comprising two diffraction gratings 11, 12 is shown in FIG. 2. It is also possible to use a stretcher comprising a single diffraction grating. The principle of a stretcher comprising a single diffraction grating is the same, but the single grating is placed far away from the center of curvature of the Offner triplet.

The stretcher 10 is characterized by the following geometric parameters:

The distance between the 2 gratings: G_ETR. In the case of a stretcher with a single diffraction grating, G_ETR is two times the distance between the diffraction grating and the center of curvature of the Offner triplet.

The angle of incidence on the 1 st grating 12 (or on the single grating): θ_ETR.

The groove density of each grating: N_ETR.

As already indicated, it is possible to achieve 1 or more passages through the stretcher.

The stretching factor is:

$$tx\_stretch = \frac{2 \cdot G\_ETR \cdot \lambda 0 \cdot N\_ETR^2 \cdot nbre\_pass\_ETR}{c \cdot \cos^3(\theta d\_ETR)}$$

where:
λ0=the average wavelength of the spectrum of the pulse,
c=the speed of light,
θd_ETR=the 1st-order angle diffracted by the first grating 12 (or the single grating) for the wavelength λ0, which is given by the formula:

$$\sin(\theta d\_ETR) + \sin(\theta\_ETR) = \lambda 0 N\_ETR$$

Figure 4:
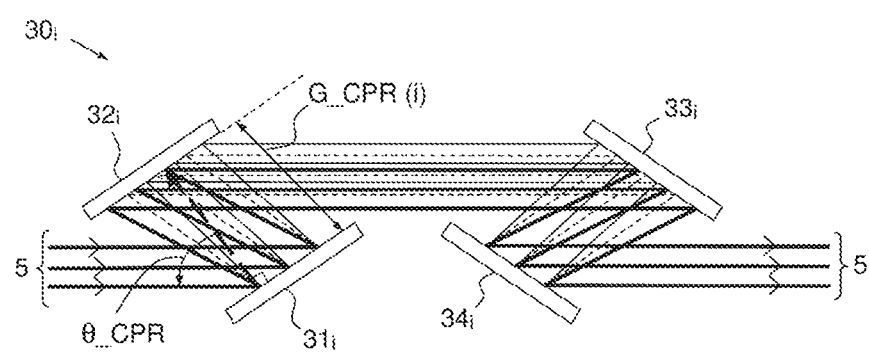

A diagram of a compressor $30_i$ is shown in FIG. 4. This compressor includes two pairs of diffraction gratings $31_i$, $32_i$, and $33_i$, $34_i$. The four gratings all have the same number of grooves per mm. The gratings $31_i$ and $34_i$ have the same dimensions; likewise for the gratings $32_i$ and $33_i$, but the dimensions of the latter may be larger than those of the gratings $31_i$ and $34_i$. The pulse 5 incident on the first grating $31_i$ is diffracted toward the second grating $32_i$ parallel to the first. It is diffracted by this second grating, which sends it to a third grating $33_i$, which diffracts it toward a fourth grating $34_i$. At the exit of this 4th grating $34_i$, the duration of the pulse 5 has been compressed.

The geometric parameters of a compressor are:
the distance between the 2 gratings of each pair: G_CPR,
the angle of incidence on the 1st grating: θ_CPR,
the groove density of the gratings: N_CPR.

The compression factor is:

$$tx\_compression = \frac{2 \cdot G\_CPR \cdot \lambda 0 \cdot N\_CPR^2}{c \cdot \cos^3(\theta d\_CPR)}$$

θd_CPR, the angle diffracted by the first grating for the wavelength λ0, is given by the formula:

$$\sin(\theta d\_CPR) + \sin(\theta\_CPR) = \lambda 0 N\_CPR$$

The spectral phase of the stretcher and of the compressor are exactly opposite if:

G_CPR=G_ETR×nbre_pass_ETR

θ_CPR=θ_ETR

N_CPR=N_ETR.

In the ideal case where no dispersive material is placed in the amplification chain the spectral phase is zero and the laser pulse is transform-limited, i.e. its duration is the shortest theoretically possible. Of course, the laser beam of an amplification chain passes through dispersive materials, amplification crystals for example. However, the stretching factor of such dispersive elements is negligible with respect to the stretching factor of the stretcher or of the compressors; the stretching factor (or equivalently the spectral phase) introduced by these dispersive elements is therefore neglected here.

According to the invention, a partially compressing device 50 is placed between the stretcher 10 and amplifier No. 1 ($20_1$).

Figure 5:
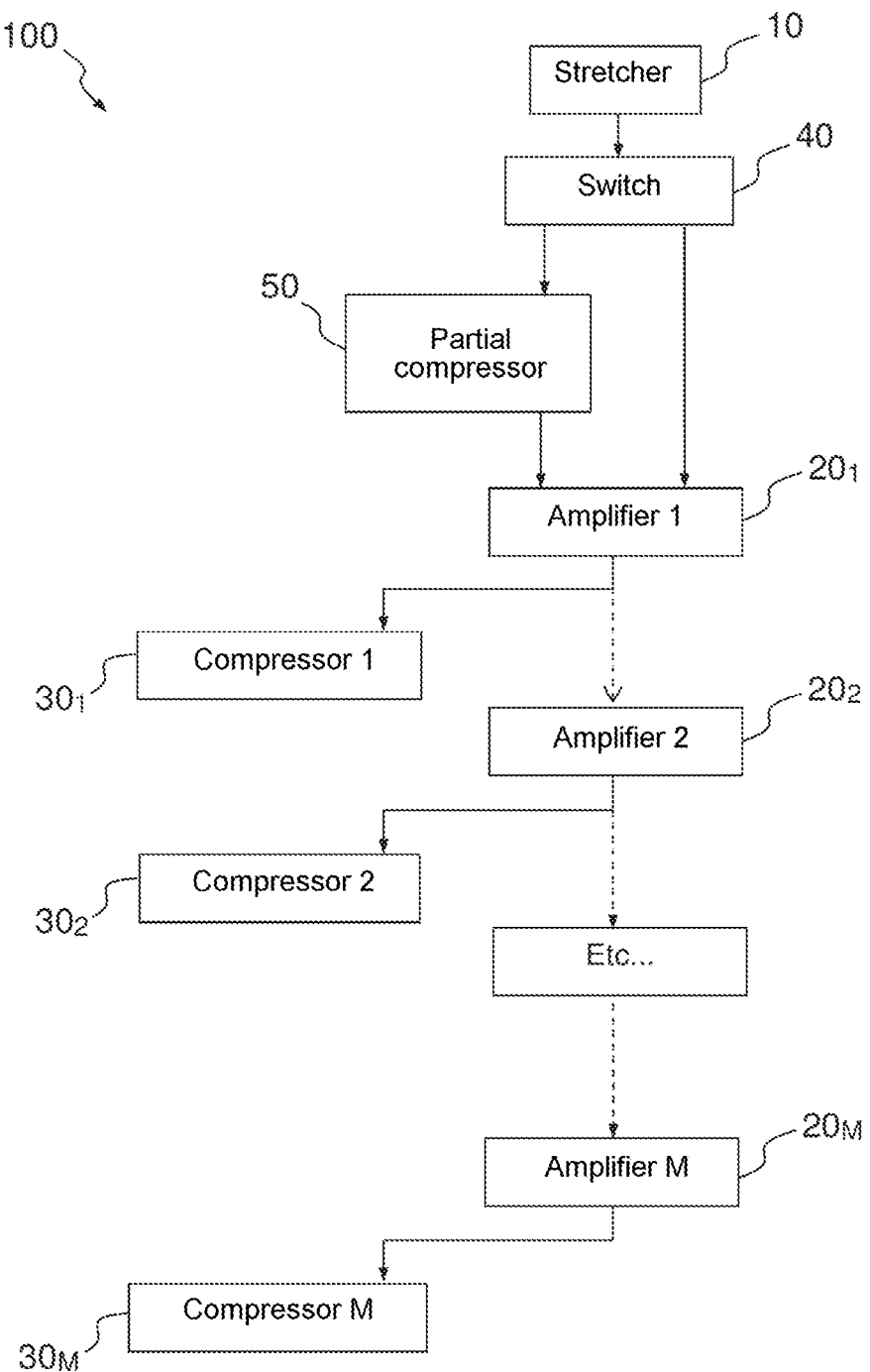

An example of an M-output chirped amplification chain 100 according to the invention is described with reference to FIG. 5.

It comprises:
a stretcher 10, connected to an
optical switch 40, connected to
a partially compressing device 50 the function of which is to be able to match the stretching factor to the compression factor of each output compressor, and
to a first amplifier $20_1$ associated with a first output compressor $30_1$, other amplifiers $20_2$, ..., $20_M$, all the amplifiers $20_2$, ..., $20_M$ being placed in cascade, each other amplifier $20_2$, ..., $20_M$ being associated with one other output compressor $30_2$, ..., $30_M$. The compression factors of the output compressors increase with rank, the last compressor, compressor M, having the highest compression factor.

Depending on the chosen output, the laser pulse output from an amplifier $20_1$, ..., $20_{M-1}$ is directed either to the compressor associated with this amplifier, or to the following amplifier, via an optical switch (not shown in the figure) placed at the output of each amplifier except the last one.

The optical switch 40 (and optionally the switches at the outputs of the amplifiers) is an optical invariant. It may be a retractable system of mirrors that comprises two parallel mirrors mounted on one and the same motorized translatable element, or a mirror mounted on a rotatable stage in order to address the partial compressor or to avoid it. Thus the partially compressing device may be selected or avoided depending on the position of this system of mirrors.

A plurality of configurations are envisioned for the partially compressing device 50, depending on the compression factors of the output compressors.

The following are defined:
tx_stretch_resist_flux: minimum stretching factor of the stretcher 10 required
for the optics of the laser amplification chain to withstand the flux. tx_stretch(i) the stretching factor of the stretcher 10 required to both limit vignetting in compressor No. i (compressor $30_i$) and to guarantee that the optics of the laser amplification chain upstream of this compressor, i.e. compressor No. i, are able to withstand the flux; therefore:

tx_stretch(i)>tx_stretch_resist_flux and as the energy received by compressor No. i is higher than the energy received by compressor No. i−1 (compressor $30_{i-1}$):

tx_stretch(i)>tx_stretch(i−1).

Regarding compressor No. M, it is vignetting that constrains the distance between the gratings of this compressor, compressor No. M (i.e. compressor $30_M$) rather than the flux resistance of the optics of the various laser amplifiers $20_1$ to $20_M$.

tx_stretch_max=max[tx_stretch(i)]=tx_stretch(M).

The stretching factor of the stretcher 10 is tx_stretch_max. tx_compression_partial, the compression factor of the partially compressing device 50, which is a parameter to be optimized.

For outputs i that respect:

tx_stretch(i)<tx_stretch_max−tx_compression_partial the laser beam output from the stretcher 10 is directed to the partially compressing device 50 by the optical switch 40.

For the other outputs (such that tx_stretch(i)>tx_stretch_max−tx_compression_partial), the laser beam output from the stretcher 10 is deviated by the optical switch 40 in order to avoid the partially compressing device 50; the beam is deviated directly to amplifier No. 1. This is in particular the case for the last output (=output of compressor No. M).

Thus, the laser pulse passes firstly through the stretcher 10. Depending on the No. i output used, i varying from 1 to M, either the pulse is sent to the partially compressing device 50, or it is sent directly to the following stage.

The laser pulse then passes through the series of amplifiers $20_1$ to $20_i$. It is then deviated toward the compressor $30_i$. It does not pass through the amplifier $20_{i+1}$.

The various compressors of the various outputs have geometric parameters equivalent to those of the stretcher: θ_CPR(i) and N_CPR(i) are close to the parameters θ_ETR and N_ETR of the stretcher. They are equal in theory but close in practice on account of the dispersive materials (the amplification crystals for example) between the stretcher and compressors. Their inter-grating distance G_CPR(i) is set depending on the desired compression factor.

The partially compressing device is for example a Treacy compressor 50a described with reference to FIG. 6 with geometric parameters equivalent to those of the other compressors $30_i$ and of the stretcher 10: same θ_CPR, same N_CPR. It comprises:

A first diffraction grating 51a, a second diffraction grating 52a. The gratings 51a and 52a have the same number of grooves, they are parallel and their grooves are parallel to one another. They may be of different size, typically the width of 52a is larger than that of 51a. A dihedron 60a allows the laser rays to be redirected toward 52a and their height to be changed. The laser rays therefore pass in order through sur 51a, 52a, 60a, 52a and 51a.

The distance G_CPR_partial(i) is about:

G_CPR_partial(i)=G_ETR×nbre_pass_ETR−G_CPR(i).

The compression factor of the partial compressor, i.e. tx_compression_partial, may be deduced therefrom. It is also possible to write: tx_compression_partial (i)=tx_stretch (M)−tx_stretch(i).

Figure 6:
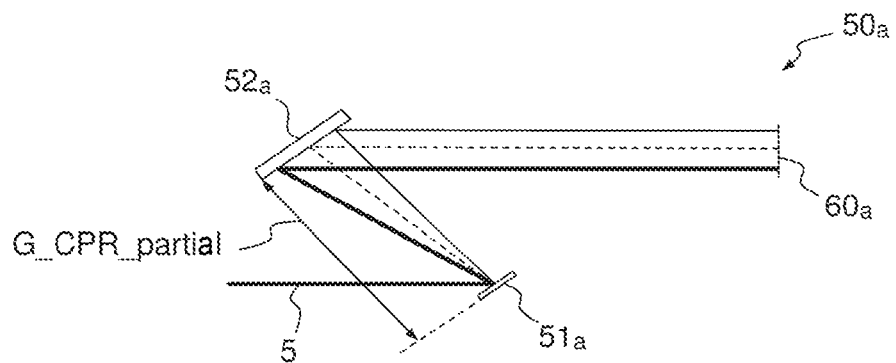

When intermediate output compressors Nos. 1 to M−1 (compressors $30_1$ to $30_{M-1}$) all have the same compression factor, the partially compressing device 50 typically includes a single partial compressor 50a of constant compression factor, one example of which is shown in FIG. 6.

When compressors Nos. 1 to M−1 do not have the same compression factor (compressors with increasing compression factors), the partially compressing device 50 may include a plurality of partial compressors, typically as many partial compressors as there are compressors $30_i$ of different compression factors. The partial compression factor of each of these partial compressors is constant and set depending on the one (or more than one) output compressor(s) that correspond thereto. These partial compressors are arranged in parallel.

Figure 7:
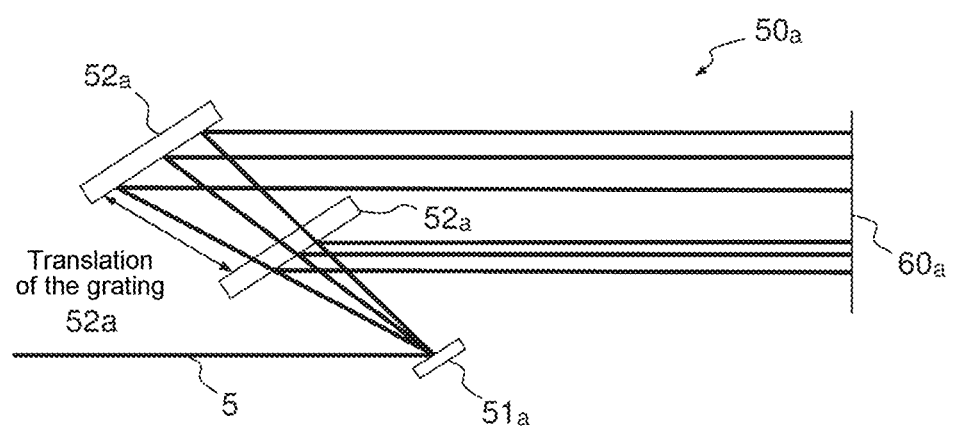
Figure 8:
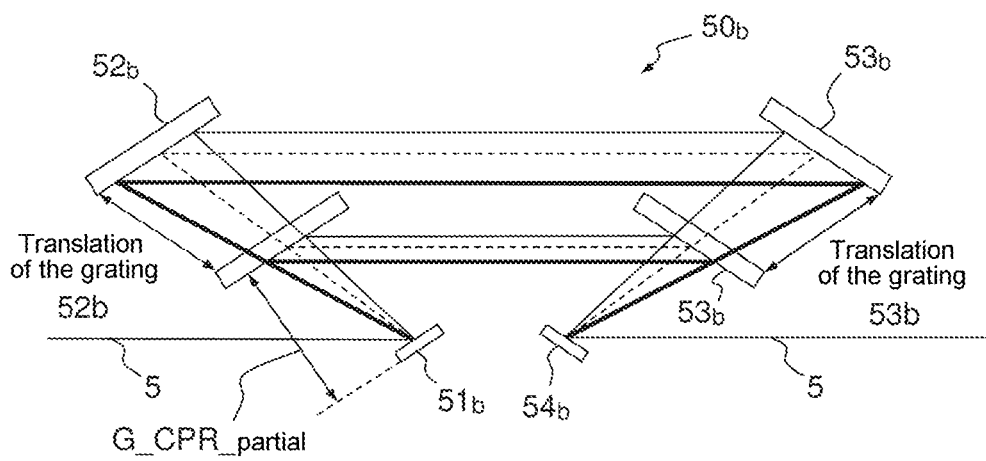

According to one alternative, the partially compressing device 50 includes one (or more than one) partial compressor(s) the compression factor of which is adjustable depending on the corresponding output compressor. This adjustable factor is for example obtained using a compressor:

the second diffraction grating 52a of which is translationally motorized in the direction of the middle ray corresponding to the wavelength of the center of the spectrum between 51a and 52a in the case of a compressor 50a comprising two gratings+a folding dihedron, one example of which is shown in FIG. 7, the dihedron 60a then being over-dimensioned for the same reasons as the stretcher shown in FIG. 2, or the second and third diffraction gratings 52b, 53b of which are translationally motorized in the direction of the middle ray corresponding to the wavelength of the center of the spectrum between 52b and 53b in the case of a compressor 50b comprising two pairs of gratings 51b, 52b, 53b, 54b as shown in FIG. 8.

This amplification chain according to the invention makes it possible both to avoid having to motorize a diffractive component of the stretcher and to use intermediate compressors (compressors $30_1$ to $30_{M-1}$) that are as compact as possible.

An example embodiment having the following specifications is described below:

Gaussian spectrum centered on 800 nm, of full width at half maximum of 60 nm.

The vignetting of the 720-890 nm spectrum must be minimized.

3 laser amplifiers with Ti:Sa crystals pumped with lasers at 532 nm.

3 output compressors (one after each laser amplifier).

minimum stretching factor: tx_stretch_resist_flux=9.58 ps/nm. This stretching factor allows damage to the optics of the laser amplifiers to be prevented.

Parameters of the amplifiers:

|  | ampli output energy (J) | CPR output energy (J) |
| --- | --- | --- |
| output 1 | 3.6 | 2.5 |
| output 2 | 35.7 | 25 |
| output 3 | 357.1 | 250 |

It is chosen to work with compressors based on conventional holographic gratings, with 1480 grooves/mm.

The angle of incidence is chosen in the vicinity of 56° (compromise between effectiveness of diffraction in the useful spectral band, and limitation of vignetting).

The maximum fluence for the holographic diffraction gratings is in the vicinity of 110 mJ/cm².

The following diameters at the input of the 3 compressors are obtained:

|  | CPR input diameter (mm) | area (cm²) |
| --- | --- | --- |
| compressor 1 | 48 | 18 |
| compressor 2 | 152 | 182 |
| compressor 3 | 481 | 1816 |

The distance G_CPR(3)=980 mm is set to limit vignetting in compressor No. 3.

The compression factor of compressor No. 3 is 14.1 ps/nm. It is therefore higher than necessary to merely ensure flux resistance, i.e. higher than tx_stretch_resist_flux=9.58 ps/nm.

According to the invention, the stretcher is designed to have the same stretching factor as the compressor M at the end of the chain, in the present case compressor No. 3.

When output 1 or 2 is used, the laser pulse is sent from the stretcher to a partially compressing device in order that the stretching factor of the stretcher (14.1 ps/nm) minus the factor of the partially compressing device (4.52 ps/nm) is equal to tx_stretch_resist_flux (9.58 ps/nm).

The parameters of the various elements are:

|  | θ_ETR | N_ETR | G_ETR | Nbre pass | stretching factor (ps/nm) |
|---|---|---|---|---|---|
| Stretcher | 56° | 1480 grooves/mm | 490 mm | 2 | 14.10 |

|  | θ_CPR | N_CPR | G_CPR | Compression factor (ps/nm) |
|---|---|---|---|---|
| Partial CPR | 56° | 1480 grooves/mm | 314 mm | 4.52 |
| CPR1 | 56° | 1480 grooves/mm | 666 mm | 9.58 |
| CPR2 | 56° | 1480 grooves/mm | 666 mm | 9.58 |
| CPR3 | 56° | 1480 grooves/mm | 980 mm | 14.10 |

Compressor 3 is therefore clearly the most voluminous.

In this example, compressors 1 and 2 have the same compression factor; the partially compressing device then includes a single compressor of constant factor.

The invention claimed is:

1. An M-output, where M>1, chirped pulse amplification chain that comprises:
 a stretcher of stretching factor tx_stretch,
 M amplifiers in cascade,
 M output compressors respectively placed at the output of each of the M amplifiers,
 further comprising:
 a partially compressing device placed between the stretcher and a first amplifier of the M amplifiers, said partially compressing device having at least one partial compression factor, one or more of said at least one partial compression factor(s) being lower than tx_stretch, and
 an optical switch configured to receive a beam output from the stretcher and to direct said beam output directly to the first amplifier of the cascade or to the partially compressing device depending on an output compressor chosen among the M output compressors.

2. The amplification chain as claimed in claim 1, wherein M>2, and wherein the partially compressing device includes a partial compressor of adjustable compression factor.

3. The amplification chain as claimed in claim 2, wherein the partial compressor includes at least one translationally motorized diffraction grating.

4. The amplification chain as claimed in claim 1, wherein M>2, and wherein the partially compressing device includes L diffraction-grating-comprising partial compressors, 1<L<M, each partial compressor having a constant compression factor.

5. The amplification chain as claimed in claim 1, configured to amplify a pulse of duration shorter than 100 fs.

6. A method for using a pulse amplification chain as claimed in claim 1, the method comprising the following steps:
 stretching a pulse with the stretcher,
 depending on a chosen output compressor chosen among said M output compressors, sending the pulse to the partially compressing device via the optical switch or passing directly to the following step,
 sending the pulse through the cascade of M amplifiers from the first amplifier to one of the M amplifiers associated with the chosen output compressor,
 sending the pulse to said chosen output compressor.

* * * * *